US010594160B2

(12) United States Patent
Jain et al.

(10) Patent No.: US 10,594,160 B2
(45) Date of Patent: Mar. 17, 2020

(54) NOISE MITIGATION IN WIRELESS POWER SYSTEMS

(71) Applicant: Apple Inc., Cupertino, CA (US)

(72) Inventors: Karan S. Jain, Cupertino, CA (US); Supratik Datta, Cupertino, CA (US); Nandita Venugopal, Cupertino, CA (US); Asif Hussain, San Jose, CA (US)

(73) Assignee: APPLE INC., Cupertino, CA (US)

( * ) Notice: Subject to any disclaimer, the term of this patent is extended or adjusted under 35 U.S.C. 154(b) by 127 days.

(21) Appl. No.: 15/474,569

(22) Filed: Mar. 30, 2017

(65) Prior Publication Data

US 2018/0198318 A1 Jul. 12, 2018

Related U.S. Application Data

(60) Provisional application No. 62/445,202, filed on Jan. 11, 2017.

(51) Int. Cl.
| | | |
|---|---|---|
| H01F 27/42 | (2006.01) | |
| H01F 37/00 | (2006.01) | |
| H01F 38/00 | (2006.01) | |
| H02J 50/10 | (2016.01) | |
| H01F 27/28 | (2006.01) | |
| H01F 27/40 | (2006.01) | |
| H01F 41/04 | (2006.01) | |

(Continued)

(52) U.S. Cl.
CPC .......... *H02J 50/10* (2016.02); *H01F 27/2804* (2013.01); *H01F 27/40* (2013.01); *H01F 38/14* (2013.01); *H01F 41/041* (2013.01); *H01F 2027/2809* (2013.01); *H02J 7/025* (2013.01)

(58) Field of Classification Search
CPC ... H02J 50/10; H02J 7/025; H01F 2027/2809; H01F 27/2804; H01F 41/041; H01F 38/14
See application file for complete search history.

(56) References Cited

U.S. PATENT DOCUMENTS

| | | | |
|---|---|---|---|
| 3,502,809 | A | 3/1970 | Dickey |
| 4,785,136 | A | 11/1988 | Mollet |
| 4,871,220 | A | 10/1989 | Kohin |

(Continued)

FOREIGN PATENT DOCUMENTS

| | | |
|---|---|---|
| CN | 101202277 | 6/2008 |
| CN | 104347259 | 2/2015 |

(Continued)

OTHER PUBLICATIONS

U.S. Appl. No. 10/044,232, filed Aug. 2018, Crosby et al.
Invitation to Pay Additional Fees and Search Report dated Mar. 23, 2018; PCT/US2018/012795; 11 pages.

*Primary Examiner* — Alfonso Perez Borroto
*Assistant Examiner* — Esayas G Yeshaw
(74) *Attorney, Agent, or Firm* — Brownstein Hyatt Farber Schreck, LLP

(57) ABSTRACT

A wireless power system includes an electrically-balanced inductor in a transmitter device and an electrically-balanced inductor in a receiver device. The electrically-balanced inductors can be formed by introducing crossovers between radially-adjacent portions of two separate turns of each inductor. The crossovers balance the electric field generated by the transmitter device when transferring power to the receiver device.

17 Claims, 12 Drawing Sheets

(51) Int. Cl.
*H01F 38/14* (2006.01)
*H02J 7/02* (2016.01)

(56) References Cited

U.S. PATENT DOCUMENTS

| | | | |
|---|---|---|---|
| 5,373,102 | A | 12/1994 | Ehrlich et al. |
| 5,384,575 | A | 1/1995 | Wu |
| 5,496,966 | A | 3/1996 | Hightower et al. |
| 5,545,844 | A | 8/1996 | Plummer, III |
| 5,563,614 | A | 10/1996 | Alden |
| 5,760,584 | A | 6/1998 | Frederick |
| 6,144,512 | A | 11/2000 | Eden |
| 6,269,247 | B1 | 7/2001 | Chiodini |
| 6,449,181 | B1 | 9/2002 | Rieger et al. |
| 6,492,587 | B1 | 12/2002 | Yoshinaga |
| 6,724,950 | B2 | 4/2004 | Byrne |
| 6,768,051 | B2 | 7/2004 | Wiltshire |
| 6,864,419 | B2 | 3/2005 | Lovens |
| 6,927,574 | B2 | 8/2005 | Young |
| 7,035,087 | B2 | 4/2006 | Tan |
| 7,068,140 | B2 | 6/2006 | Chou |
| 7,170,363 | B2 | 1/2007 | Wiltshire |
| 7,466,077 | B2 | 12/2008 | Joo et al. |
| 7,639,206 | B2 | 12/2009 | Behdad |
| 7,679,205 | B1 | 3/2010 | Burns |
| 7,705,591 | B2 | 4/2010 | Geren et al. |
| 7,732,038 | B2 | 6/2010 | Naito et al. |
| 7,737,370 | B2 | 6/2010 | Aoyama et al. |
| 7,791,311 | B2 | 9/2010 | Sagoo |
| 7,906,936 | B2 | 3/2011 | Azancot et al. |
| 7,948,208 | B2 | 5/2011 | Partovi et al. |
| 7,948,781 | B2 | 5/2011 | Esaka et al. |
| 7,952,322 | B2 | 5/2011 | Partovi et al. |
| 8,050,063 | B2 | 11/2011 | Wagoner et al. |
| 8,101,931 | B2 | 1/2012 | Blandford, III |
| 8,115,448 | B2 | 2/2012 | John |
| 8,169,185 | B2 | 5/2012 | Partovi et al. |
| 8,193,769 | B2 | 6/2012 | Azancot et al. |
| 8,262,244 | B2 | 9/2012 | Metcalf |
| 8,338,990 | B2 | 12/2012 | Baarman et al. |
| 8,421,274 | B2 | 4/2013 | Sun et al. |
| 8,436,317 | B1 | 5/2013 | Chen |
| 8,531,153 | B2 | 9/2013 | Baarman et al. |
| 8,587,154 | B2 | 11/2013 | Fells et al. |
| 8,629,652 | B2 | 1/2014 | Partovi et al. |
| 8,629,654 | B2 | 1/2014 | Partovi et al. |
| 8,723,053 | B2 | 5/2014 | Winch |
| 8,729,734 | B2 | 5/2014 | Widmer et al. |
| 8,760,113 | B2 | 6/2014 | Keating et al. |
| 8,779,745 | B2 | 7/2014 | Brown |
| 8,810,196 | B2 | 8/2014 | Ettes et al. |
| 8,836,276 | B2 | 9/2014 | Prescott |
| 8,838,022 | B2 | 9/2014 | Dobyns |
| 8,890,470 | B2 | 11/2014 | Partovi |
| 8,896,264 | B2 | 11/2014 | Partovi |
| 8,901,881 | B2 | 12/2014 | Partovi |
| 8,928,284 | B2 | 1/2015 | Carobolante |
| 8,947,047 | B2 | 2/2015 | Partovi et al. |
| 8,947,892 | B1 | 2/2015 | Lam |
| 9,001,031 | B2 | 4/2015 | Lo et al. |
| 9,025,143 | B2 | 5/2015 | Hahn |
| 9,041,152 | B2 | 5/2015 | Luo et al. |
| 9,065,423 | B2 | 6/2015 | Ganem et al. |
| 9,071,062 | B2 | 6/2015 | Whitehead |
| 9,106,083 | B2 | 8/2015 | Partovi |
| 9,112,362 | B2 | 8/2015 | Partovi |
| 9,112,363 | B2 | 8/2015 | Partovi |
| 9,112,364 | B2 | 8/2015 | Partovi |
| 9,118,203 | B2 | 8/2015 | Davis |
| 9,124,126 | B2 | 9/2015 | Ichikawa |
| 9,153,998 | B2 | 10/2015 | Mayo |
| 9,161,484 | B2 | 10/2015 | Baarman et al. |
| 9,171,555 | B2 | 10/2015 | Meloche |
| 9,177,716 | B2 | 11/2015 | Goto |
| 9,178,369 | B2 | 11/2015 | Partovi |
| 9,209,627 | B2 | 12/2015 | Baarman et al. |
| 9,217,323 | B2 | 12/2015 | Clark |
| 9,276,437 | B2 | 3/2016 | Partovi et al. |
| 9,281,759 | B2 | 3/2016 | Lee et al. |
| 9,300,147 | B2 | 3/2016 | Lee et al. |
| 9,356,659 | B2 | 5/2016 | Partovi |
| 9,497,894 | B1 | 11/2016 | Ramsey |
| 9,548,158 | B2 | 1/2017 | Groves et al. |
| 9,577,460 | B2 | 2/2017 | Park |
| 9,620,983 | B2 | 4/2017 | Abdelmoneum et al. |
| 9,643,507 | B2 | 5/2017 | Scarlatti et al. |
| 9,711,272 | B2 | 7/2017 | Hassan-Ali et al. |
| 9,726,518 | B2 | 8/2017 | Widmer et al. |
| 9,735,628 | B2 | 8/2017 | Efe et al. |
| 9,748,326 | B2 | 8/2017 | Yen et al. |
| 9,831,686 | B2 | 11/2017 | Kohara et al. |
| 9,862,282 | B2 | 1/2018 | Boser et al. |
| 9,893,553 | B2 | 2/2018 | Pudipeddi et al. |
| 9,917,479 | B2 | 3/2018 | Bronson et al. |
| 10,141,785 | B2 | 11/2018 | Son et al. |
| 10,477,741 | B1 | 11/2019 | Bae et al. |
| 2002/0137473 | A1 | 9/2002 | Jenkins |
| 2004/0021376 | A1 | 2/2004 | Beulich |
| 2008/0067914 | A1 | 3/2008 | Kim et al. |
| 2008/0303479 | A1* | 12/2008 | Park ............... H02J 7/025 320/108 |
| 2009/0052721 | A1 | 2/2009 | Dabrowski |
| 2010/0015918 | A1 | 1/2010 | Liu et al. |
| 2011/0050164 | A1 | 3/2011 | Partovi et al. |
| 2011/0101788 | A1* | 5/2011 | Sun ............... H01F 38/14 307/104 |
| 2011/0164471 | A1* | 7/2011 | Baarman ........... H02J 7/025 368/10 |
| 2011/0169770 | A1 | 7/2011 | Mishina et al. |
| 2011/0221385 | A1 | 9/2011 | Partovi et al. |
| 2012/0104997 | A1 | 5/2012 | Carobolante |
| 2012/0139358 | A1 | 6/2012 | Teggatz et al. |
| 2012/0198364 | A1 | 8/2012 | Bornheimer et al. |
| 2013/0043734 | A1 | 2/2013 | Stone et al. |
| 2013/0093388 | A1 | 4/2013 | Partovi |
| 2013/0099563 | A1 | 4/2013 | Partovi et al. |
| 2013/0260677 | A1 | 10/2013 | Partovi |
| 2013/0271069 | A1 | 10/2013 | Partovi |
| 2013/0285604 | A1 | 10/2013 | Partovi |
| 2013/0285605 | A1 | 10/2013 | Partovi |
| 2013/0300204 | A1 | 11/2013 | Partovi |
| 2014/0035383 | A1 | 2/2014 | Riehl |
| 2014/0103873 | A1 | 4/2014 | Partovi et al. |
| 2014/0132210 | A1 | 5/2014 | Partovi |
| 2014/0191568 | A1 | 7/2014 | Partovi |
| 2014/0306654 | A1 | 10/2014 | Partovi |
| 2014/0354279 | A1 | 12/2014 | Dumoulin et al. |
| 2015/0043424 | A1 | 2/2015 | Mitchell |
| 2015/0130412 | A1 | 5/2015 | Partovi |
| 2015/0288193 | A1 | 10/2015 | Crosby et al. |
| 2015/0303706 | A1* | 10/2015 | Bronson ........... H01F 27/2804 307/104 |
| 2015/0303707 | A1 | 10/2015 | McCauley et al. |
| 2015/0318710 | A1 | 11/2015 | Lee et al. |
| 2015/0326028 | A1* | 11/2015 | Suzuki ............ H02J 7/025 307/104 |
| 2015/0333530 | A1 | 11/2015 | Moyer et al. |
| 2015/0333562 | A1 | 11/2015 | Nam et al. |
| 2016/0036261 | A1 | 2/2016 | Lenive |
| 2016/0064137 | A1 | 3/2016 | Perez et al. |
| 2016/0172894 | A1 | 6/2016 | Khripkov et al. |
| 2016/0181853 | A1 | 6/2016 | Yang et al. |
| 2016/0196943 | A1 | 7/2016 | Jarrahi et al. |
| 2016/0284465 | A1 | 9/2016 | Maniktala |
| 2016/0372948 | A1 | 12/2016 | Kvols |
| 2017/0047162 | A1* | 2/2017 | Muntean ........... H01F 38/14 |
| 2017/0092409 | A1 | 3/2017 | Graham |
| 2017/0093199 | A1 | 3/2017 | Pinciuc et al. |
| 2017/0279305 | A1 | 9/2017 | Staring et al. |
| 2017/0353046 | A1* | 12/2017 | Chen ............... H02J 50/12 |
| 2018/0048503 | A1* | 2/2018 | Kim ............... H04L 27/26 |
| 2018/0062430 | A1* | 3/2018 | Matsumoto ........ H02J 7/00 |
| 2018/0062442 | A1 | 3/2018 | Qiu et al. |

(56) References Cited

U.S. PATENT DOCUMENTS

| | | |
|---|---|---|
| 2018/0198318 A1 | 7/2018 | Jain et al. |
| 2018/0226822 A1 | 8/2018 | Seo et al. |
| 2019/0058348 A1 | 2/2019 | Wang et al. |

FOREIGN PATENT DOCUMENTS

| | | |
|---|---|---|
| EP | 2211438 | 7/2010 |
| EP | 2256895 | 12/2010 |
| JP | 5510608 | 6/2014 |
| KR | 20080081480 | 9/2008 |
| WO | WO 08/032746 | 3/2008 |
| WO | WO 09/081126 | 7/2009 |

\* cited by examiner

NOISE MITIGATION IN WIRELESS POWER SYSTEMS

CROSS-REFERENCE TO RELATED APPLICATIONS

This application is a nonprovisional patent application of, and claims the benefit to, U.S. Provisional Patent Application No. 62/445,202, filed Jan. 11, 2017 and titled "Noise Mitigation In Wireless Power Systems," the disclosure of which is hereby incorporated herein in their entirety.

FIELD

Embodiments described herein generally relate to wireless power systems and, in particular, to wireless power systems contemporaneously operable with capacitive sensors.

BACKGROUND

A mobile device can recharge an internal battery by wirelessly coupling to a power converter that is connected to a power source. Collectively, the mobile device and power converter be referred to as a "wireless power system" that transfers power from the power source to the internal battery.

A conventional wireless power system includes a transmitter that magnetically couples to a receiver within the mobile device to deliver power by electromagnetic induction. However, the conventional wireless power system also introduces voltage noise to the mobile device—via capacitive coupling—during transferring power. Voltage noise can affect voltage-sensitive systems within the mobile device, such as capacitive user input systems, capacitive fingerprint systems, capacitive proximity sensors, and so on.

As a result, many conventional mobile devices disable or limit the operation of voltage-sensitive systems when receiving wirelessly-transferred power, introducing inconsistencies to the user experience of operating the mobile device. Other conventional mobile devices incorporate grounded shields that reduce voltage noise, but also reduce the efficiency of the wireless power system, thereby increasing battery charging time and cost.

SUMMARY

Embodiments described herein generally reference wireless power systems including a transmitter and a receiver. The transmitter includes a substrate and an array or distribution of transmitter coils on the substrate. In many cases, the transmitter coils are formed onto the substrate, but this may not be required. Each of the transmitter coils are formed with at least one crossover per turn. Typically, a crossover is formed with a corresponding, diametrically opposite, crossover although this may not be required of all embodiments.

The wireless power system also includes a receiver configured to magnetically couple to at least one transmitter coil of the array. The receiver includes a receiver coil that, when magnetically coupled to a transmitter coil, can receive power by electromagnetic induction. As with the transmitter coils of the transmitter, the receiver coil is also typically formed with at least one crossover per turn. In some embodiments, coils of either or both the array of transmitter coils or the receiver can include an in-line filter capacitor. In some cases, the in-line filter capacitor bisects a coil, separating the coil into a first portion and a second portion. In this configuration, the in-line filter capacitor is configured to operate as a high-pass filter.

Other embodiments described herein generally reference method of forming an inductor for a wireless power system. The method includes the operations of: selecting a turn layer with a first turn trace and a second turn trace; positioning a crossover layer on the turn layer, the crossover layer including a crossover trace positioned over the first turn trace and over the second turn trace; and electrically connecting the crossover trace to the first turn trace and the second turn trace.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
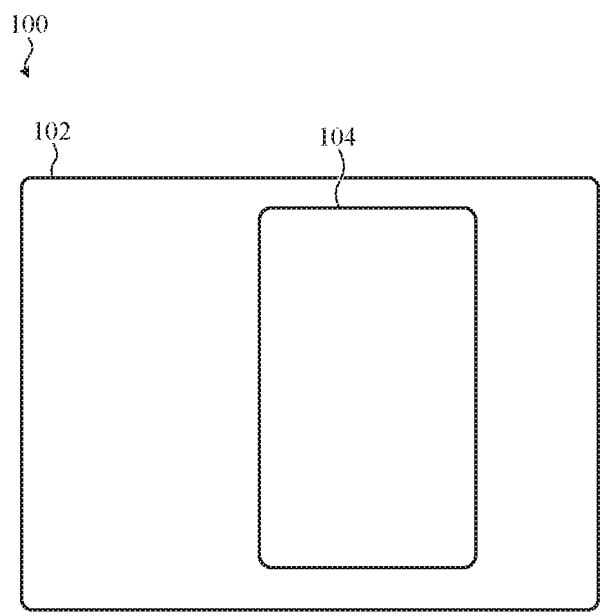
FIG. 1A depicts a wireless power system including a transmitter and a receiver.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference a wireless power system including a transmitter device and a receiver device. A transmitter coil in the transmitter device magnetically couples to a receiver coil in the receiver device to transfer electrical power to the receiver device by electromagnetic induction.

In particular, embodiments described herein reference certain electrically-balanced coil constructions of either or both the transmitter coil and the receiver coil that are configured to reduce and/or eliminate common mode noise in the receiver device that can result from an unbalanced capacitive coupling between a conventionally-constructed transmitter coil and a conventionally-constructed receiver coil of a conventional wireless power system.

More specifically, in a conventional wireless power system, a conventionally-constructed transmitter coil is defined by a number turns that follow a spiral path from an outer radius to an inner radius. As alternating electric current moves through the conventionally-constructed transmitter coil, progressive impedance through the coil results in a voltage gradient from the outer radius to the inner radius that varies with the input current. The varying voltage gradient results in a varying electric field that influences reference voltage levels (e.g., ground plane, supply lines, signal lines, and so on) in a conventionally-constructed receiver device nearby. In other words, the conventionally-constructed transmitter coil can introduce common mode noise into a conventionally-constructed receiver device via capacitive coupling.

In these conventional cases, when the receiver device is touched by a user—or otherwise electrically grounded—various reference voltage levels in the device can change by an unknown amount. This uncontrollable variability can interfere with the operation of certain systems in the receiver device, such as touch input systems or capacitive sensors.

More specifically, systems in the receiver device that depend on differential voltage measurements can behave unpredictably when the receiver device is receiving power, wirelessly, from a conventionally-constructed transmitter coil. For example, in the case of a capacitive touch sensor, false touch events can be registered and/or actual touch events may be rejected. Such unpredictable receiver device behavior negatively impacts the user experience of operating the device.

Furthermore, in some cases, a conventional transmitter device can include multiple conventionally-constructed transmitter coils, each configured to transfer power to a respective one receiver device or receiver coil. In these examples, a single receiver device can capacitively couple to multiple transmitter coils, which may or may not be in-phase with one another. In other words, the receiver device can be subject to both differential mode noise and to common mode noise.

To mitigate the negative effects of unpredictable receiver device behavior, many conventional receiver devices disable or limit the operation of voltage-sensitive systems when the device is receiving power from a conventionally-constructed transmitter coil. For example, a conventional receiver device can disable or reduce the sensitivity a capacitive touch screen when that device is receiving power.

Other conventional receiver devices or transmitter devices include grounded shields configured to protect voltage-sensitive systems in a receiver device from common mode noise or differential mode noise that can result from capacitive coupling. However, grounded shield are necessarily formed from electrically-conductive materials and, as such, reduce the efficiency of power transfer from the transmitter device to the receiver device (e.g., via thermal losses from eddy currents, flux redirection, and so on). Further, grounded shields often add to manufacturing cost and thickness of a device.

Accordingly, embodiments described herein reference various transmitter coil and receiver coil constructions that reduce the variability of electric fields produced by a transmitter coil and, alternatively, reduce the susceptibility of a receiver coil to capacitive coupling. For the simplicity of the description provided herein, the general terms "inductor" or "electrically-balanced inductor" are used for embodiments in which a particular coil construction may be appropriate for either a transmitter coil or a receiver coil.

Wireless power systems incorporating electrically-balanced inductors, such as described herein, whether in either or both the transmitter device or receiver device, can, without limitation: include a receiver device and/or a transmitter device manufactured without a requirement for additional shields; transfer power from a transmitter device to a receiver device at high efficiency; transfer power from a transmitter device to multiple receiver devices simultaneously and at high efficiency; include a receiver device that incorporates voltage-sensitive systems that can be operated while the receiver device receives power from a transmitter device; and so on.

An electrically-balanced inductor, such as described herein, can be constructed by introducing at least one crossover per turn of the inductor. The term "crossover," as used herein, broadly refers to an electrical connection between radially-adjacent portions of two separate turns of an inductor. Typically, turns that are joined by a crossover are neighboring turns (e.g., adjacent to one another), but this may not be required of all embodiments.

The crossovers in an electrically-balanced inductor, such as described herein, balance electrical fields generated by a transmitter coil and electrical field effects experienced by a receiver coil. More specifically, as alternating electric current moves through an electrically-balanced transmitter coil, voltage drops from turn to turn are spatially distributed such that the difference in electric field magnitude between adjacent turns is substantially consistent, regardless of the polarity of current passing through the inductor. In other words, when configured to operate as a transmitter coil of a wireless power system, an electrically-balanced inductor produces an electric field that exhibits substantially reduced variability, and, as such, does not strongly electrically couple to nearby conductors (e.g., a receiver coil). Alternatively, when configured to operate as a receiver coil of a wireless power system, the influence of a nearby electric field is distributed across alternating turns of the inductor, thereby reducing differential mode and common mode noise received through capacitive coupling.

Many embodiments described herein reference a wireless power system that includes an electrically-balanced transmitter coil in a transmitter device and an electrically-balanced receiver coil in a receiver device. Such a system exhibits substantially reduced capacitive coupling between the transmitter device and the receiver device, enabling operation of voltage-sensitive systems within the receiver device when wirelessly transferring power. It is appreciated, however, that this system configuration may not be required; a wireless power system such as described herein can include one of a transmitter device with an electrically-balanced transmitter coil or a receiver device with an electrically-balanced receiver coil.

Notwithstanding the foregoing, and for simplicity of description, many embodiments that follow (including those discussed below with reference to FIGS. 1A-10) refer to an example transmitter device as a "charging mat" and an example receiver device as a "mobile device." A charging mat such as described herein includes multiple electrically-balanced transmitter coils, arranged or distributed on one or more layers of a substrate, but this may not be required and in some embodiments, a single electrically-balanced transmitter coil may be suitable. Similarly, a mobile device such as described herein includes a single electrically-balanced receiver coil, but this may not be required; additional electrically-balanced receiver coils can be included in other embodiments. As such, those skilled in the art will readily appreciate that the detailed description given herein with respect to the following figures is for explanation only and should not be construed as limiting.

Figure 1B:
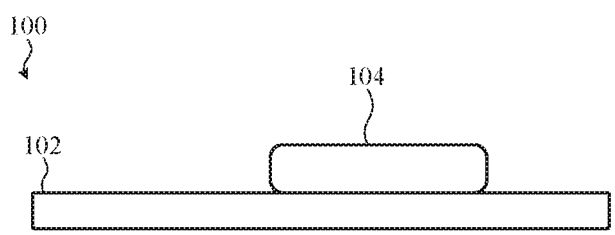
FIG. 1B depicts a side view of the power converter of FIG. 1A.

Generally and broadly, FIGS. 1A-1B depict a wireless power system 100 including a charging mat 102 and a mobile device 104. In particular, FIG. 1A depicts a plan view the wireless power system 100 and FIG. 1B depicts a side view of the wireless power system 100, specifically illustrating an example embodiment in which a charging mat 102 is accommodated in a low-profile (e.g., thin) enclosure. The wireless power system 100 is configured to transfer power—via electromagnetic induction—from the charging mat 102 to one or more mobile devices, one of which may be the mobile device 104.

The charging mat is accommodated in an enclosure. The enclosure can accommodate: one or more electrically-balanced transmitter coils or transmitter coil arrays or layers, a processor, memory, display, battery, network connections, sensors, input/output ports, acoustic elements, haptic elements, digital and/or analog circuits for performing and/or coordinating tasks of the wireless power system 100, and so on. For simplicity of illustration, the enclosure is depicted in FIG. 1A without many of these elements, each of which may be included, partially and/or entirely, within the enclosure and may be operationally or functionally associated with the charging mat 102. In some embodiments, the charging mat 102 is fully-integrated; all components of the charging mat 102 are within the enclosure, apart from an electrical connection (e.g., cable) to mains voltage, which is not depicted.

Like the charging mat 102, the mobile device 104 is accommodated within an enclosure. Typically, the enclosure of the mobile device 104 is smaller than the enclosure of the charging mat 102, but this may not be required. The enclosure of the mobile device 104 can accommodate: one or more electrically-balanced receiver coils, a processor, memory, display, battery, voltage-sensitive systems, capacitive or other sensors, network connections, input/output ports, acoustic elements, haptic elements, digital and/or analog circuits for performing and/or coordinating tasks of the wireless power system 100 or another electronic device, and so on. For simplicity of illustration, the enclosure of the mobile device 104 is depicted in FIG. 1A without many of these elements, each of which may be included, partially and/or entirely, within the enclosure and may be operationally or functionally associated with the mobile device 104.

In some examples, the mobile device 104 is electronic device such as a cellular phone, a tablet computer, a wearable electronic device (e.g., watch, pendant, bracelet, necklace, anklet, ring, headphone, glasses, wearable display, and so on), a peripheral input device (e.g., keyboard, mouse, trackpad, remote control, stylus, gaming device, gesture input device, and so on), an authentication device or token (e.g., password token, vehicle key, and so on), an access card, an anti-theft or loss prevention device, a home automation device, a display, and so on.

In the illustrated embodiment, the enclosure of charging mat 102 defines an interface surface for receiving the mobile device 104. The interface surface can be substantially planar, although this is not required. For example, in some embodiments, the interface surface may be concave, convex, or may take another shape.

Figure 2A:
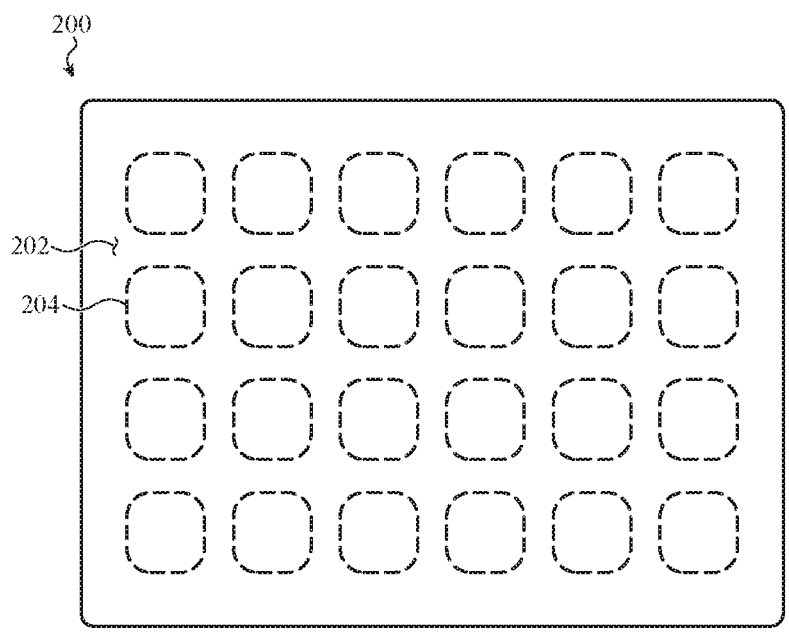
FIG. 2A depicts one layer of a transmitter array of a wireless power system, such as depicted in FIG. 1A.

In many examples, the charging mat 102 includes multiple electrically-balanced transmitter coils distributed at different locations relative to the interface surface (see, e.g., FIG. 2A). Typically, as noted above, each transmitter coil of the charging mat 102 is an electrically-balanced inductor (e.g., including at least one crossover per turn), but this may not be required.

In these embodiments, individual transmitter coils can be associated with different portions of the interface surface. In this manner, the wireless power system 100 can selectively activate or deactivate transmitter coils of the charging mat 102 independently.

Further, the wireless power system 100 can selectively control power output from each transmitter coil. In many cases, the wireless power system 100 can selectively active a transmitter coil (or more than one transmitter coil) based on the position and/or orientation of the mobile device 104 relative to the interface surface and, in particular, relative to the location of the nearest transmitter coil or coils. More specifically, the wireless power system 100 can selectively activate a transmitter coil based on a coupling factor k that corresponds to the mutual coupling between that transmitter coil and a receiver coil disposed within the mobile device 104; the higher the coupling factor, the more likely the wireless power system 100 is to activate that transmitter coil to effect power transfer from that transmitter coil of the charging mat 102 to the receiver coil within the mobile device 104.

The foregoing embodiment depicted in FIGS. 1A-1B and the various alternatives thereof and variations thereto is presented, generally, for purposes of explanation, and to facilitate an understanding of various possible electronic devices or accessory devices that can incorporate, or be otherwise associated with, a wireless power system, such as described herein. However, it will be apparent to one skilled in the art that some of the specific details presented herein may not be required in order to practice a particular described embodiment, or an equivalent thereof.

Figure 2B:
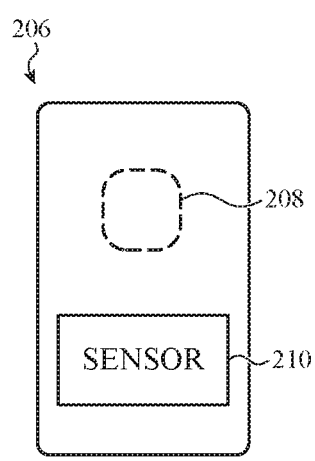
FIG. 2B depicts a mobile device that can magnetically couple to—and receive power from—the transmitter array depicted in FIG. 2A.

Generally and broadly, FIGS. 2A-2B depict a wireless power system, such as the wireless power system shown in FIGS. 1A-1B. In particular, FIG. 2A depicts a charging mat 200 with a layer of transmitter coils distributed below an interface surface 202. One transmitter coil of the distribution of transmitter coils is labeled as the transmitter coil 204. The transmitter coil 204, along with the other transmitter coils of the distribution of transmitter coils, is depicted as a rounded rectangle, but this shape is not required. In some embodiments, the transmitter coil 204 can be circular, polygonal, or may take another shape. Similarly, it may not be required to arrange the transmitter coils in a grid such as shown.

FIG. 2B depicts a mobile device 206 with a receiver coil 208 and a capacitive sensor 210 positioned proximate to the receiver coil 208. The capacitive sensor 210 can be any suitable voltage-sensitive system or sensor such as, but not limited to: capacitive touch input systems, capacitive force input systems, capacitive switches, capacitive buttons, capacitive image sensors, capacitive biometric sensors, capacitive humidity sensors, capacitive particle detectors, and so on. In some cases, the capacitive sensor 210 can be positioned adjacent to (e.g., beside, above, below, and so on) the receiver coil 208, whereas in others, the capacitive sensor 210 can be intentionally separated from the receiver coil 208 within the enclosure of the mobile device 206.

As with other embodiments described herein, the receiver coil 208 of the mobile device 206 can be aligned with one or more transmitter coils, such as the transmitter coil 204, when the mobile device 206 is placed on the interface surface 202 to achieve wireless power transfer between the charging mat 200 and the mobile device 206, via electromagnetic induction. More specifically, the transmitter coil 204 and the receiver coil 208 can be magnetically coupled when an alternating current passes through the transmitter coil 204. The frequency of the alternating current passing through the transmitter coil 204 may be associated with an induction mode (e.g., on the order of kilohertz) or a resonance mode (e.g., on the order of megahertz).

Typically, each transmitter coil of the distribution of transmitter coils (including the transmitter coil 204) is an electrically-balanced inductor, but this may not be required of all embodiments. For example, a certain subset of transmitter coils of the distribution of transmitter coils can be conventional inductors (e.g., spiral turns) whereas others may be electrically-balanced inductors, such as described herein. In further embodiments, only a single transmitter coil may be required. Similarly, the receiver coil 208 can be an electrically-balanced inductor, but this may not be required of all embodiments.

Figure 3A:
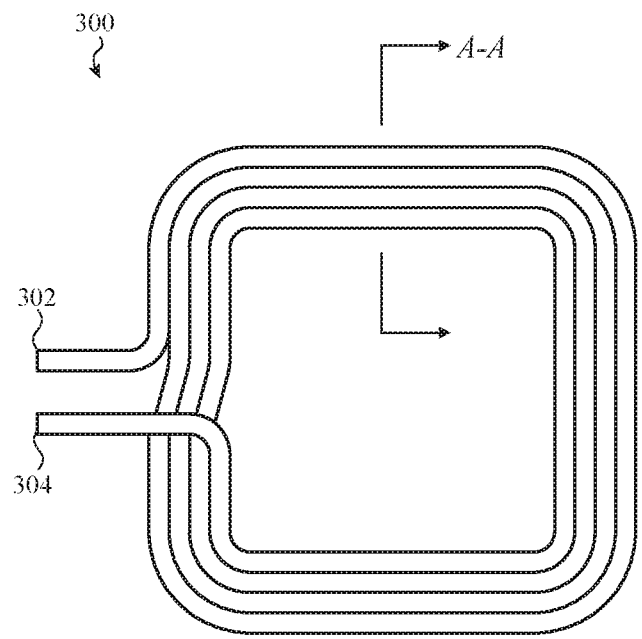
FIG. 3A depicts an inductor of a wireless power system.
Figure 3B:
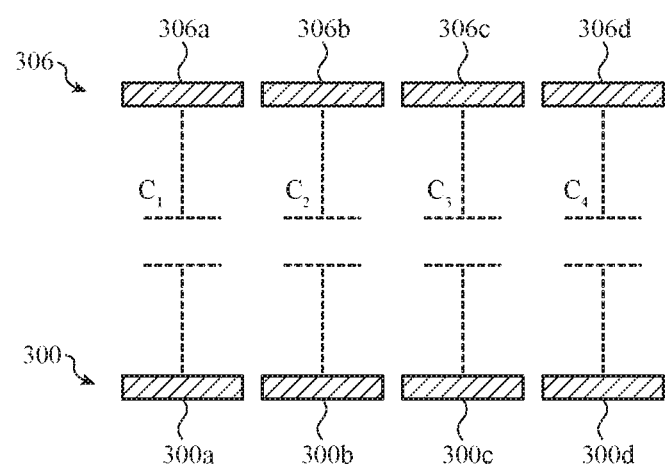
FIG. 3B depicts a simplified representation of capacitive coupling between inductors of a wireless power system, such as those depicted in FIG. 3A.

Generally and broadly, FIGS. 3A-3B depict a vertically-aligned set of magnetically coupled inductors of a wireless power system. The illustrated inductors are constructed without crossovers and, as such, may be susceptible to capacitive coupling.

In this example, a transmitting inductor 300 is defined by a number turns that follow a spiral path from an outer radius to an inner radius. An electric current circulates through the transmitting inductor 300 when a voltage is applied across its terminals. As the electric current moves through the transmitting inductor 300, it encounters impedance that progressively reduces the applied voltage from the positive terminal to the negative terminal. In other words, different portions of the transmitting inductor 300 experience different voltages.

Generally, a voltage difference between separated portions of a circuit or circuit element can be alternatively expressed as an electric field having a magnitude proportionately related to that voltage and to the distance between those separated portions.

As may be appreciated, an electric field—especially a changing electric field—has the capacity to influence electric charge (e.g., current) in a nearby conductor. More specifically, if an electric field changes (e.g., in position or magnitude), a voltage measured between the electric field source and a nearby conductor correspondingly changes, and a current is exhibited within the conductor that resists that change in voltage. This relationship between the electric field source and the conductor is typically modeled as a capacitance, and represented in a circuit diagram as a capacitor, or as a set of capacitors. Such capacitors can be referred to as capacitive couplings between circuits, or circuit portions.

Returning to FIG. 3A, the transmitting inductor 300 includes a first terminal 302 and a second terminal 304. If a positive voltage is applied from the first terminal 302 to the second terminal 304, a voltage at any point along the outer turn of the transmitting inductor 300 (referenced to ground or to the second terminal 304) is higher than a voltage at any point along the inner turn of the transmitting inductor 300. In this example, the voltage from the outer radius to the inner radius generally decreases.

In the alternative, if a positive voltage is applied from the second terminal 304 to the first terminal 302, a voltage at any point along the outer turn of the transmitting inductor 300 is lower (referenced to ground or to the first terminal 302) than a voltage at any point along the inner turn of the transmitting inductor 300. In this example, the voltage from the outer radius to the inner radius generally increases.

More specifically, and with reference to FIG. 3B, when a positive voltage is applied across the first terminal 302 and the second terminal 304, a voltage measured between an outer turn 306a and the second terminal 304 is greater than a voltage measured between a first interior turn 300b and the second terminal 304 which is greater than a voltage measured between a second interior turn 300c and the second terminal 304 which, in turn, is greater than a voltage measured between an inner turn 306d and the second terminal 304. In this example, the voltage drop (e.g., voltage difference) from the outer turn 300a to the inner turn 300d can be represented as an electric field directed from the outer turn 300a to the inner turn 300d and having a generally decreasing magnitude.

Alternatively, if a negative voltage is applied from the first terminal 302 to the second terminal 304, a voltage at any point along the outer radius of the transmitting inductor 300 is lower than a voltage at any point along the inner radius of the transmitting inductor 300. More specifically, a voltage measured between the outer turn 306a and the first terminal 302 is less than a voltage measured between the first interior turn 300b and the first terminal 302 which is less than a voltage measured between the second interior turn 300c and the first terminal 302 which in turn is less than a voltage measured between the inner turn 306d and the first terminal 302. In this example, the voltage gradient from the outer turn 300a to the inner turn 300d can be represented as an electric field directed from the inner turn 300d to the outer turn 300a and having a generally increasing magnitude.

As such, when an alternating current is applied the transmitting inductor 300, the electric field generated by the voltage differentials between different turns of the transmitting inductor 300 changes in both direction and magnitude with the alternating current applied to the inductor. The varying electric field can couple to a receiving inductor 306, contributing common mode noise to one or more systems associated with, or connected to, the receiving inductor 306. In the illustrated example, the receiving inductor 306 is aligned with the transmitting inductor 300. Capacitive coupling between the receiving inductor 306 and the transmitting inductor 300 is modeled with the coupling capacitors $C_1$, $C_2$, $C_3$, and $C_4$.

In particular, an outer turn 300a of the transmitting inductor 300 is depicted as capacitive coupled—via the coupling capacitor $C_1$—to an outer turn 306a of the receiving inductor 306. Similar coupling relationships are depicted in FIG. 3B for: the first interior turn 300b of the transmitting inductor 300 and the first interior turn 306b of the receiving inductor 306 via the coupling capacitor $C_2$, the second interior turn 300c of the transmitting inductor 300 and the second interior turn 306c of the receiving inductor 306 via the coupling capacitor $C_3$, and the inner turn 300d of the transmitting inductor 300 and the inner turn 306d of the receiving inductor 306 via the coupling capacitor $C_4$.

In this configuration, when the transmitting inductor 300 is magnetically coupled to the receiver inductor 306 to transfer power wirelessly, the electric field generated by the voltage differentials correspond to different voltages across each of the coupling capacitors $C_1$, $C_2$, $C_3$, and $C_4$. As a result of the changing voltage across the coupling capacitors $C_1$, $C_2$, $C_3$, and $C_4$, alternating current is transferred to the receiving inductor 306 as common mode noise via capacitive coupling.

Figure 4A:
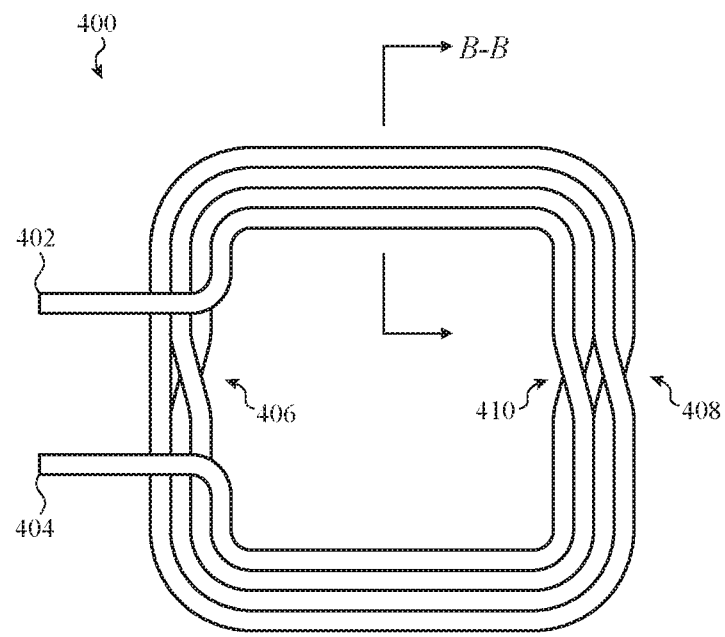
FIG. 4A depicts an electrically-balanced inductor of a wireless power system.
Figure 4B:
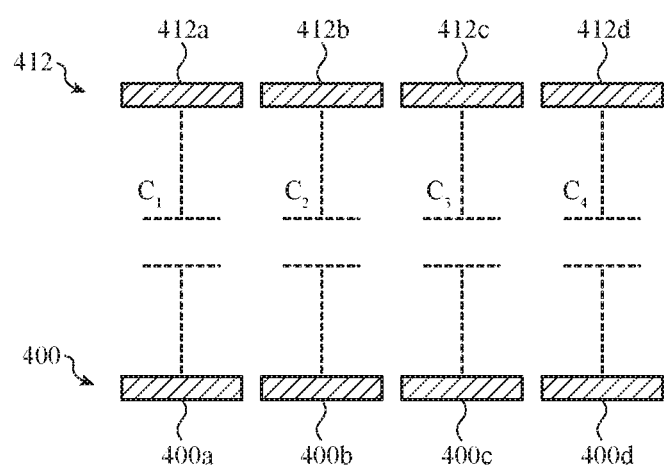
FIG. 4B depicts a simplified representation of reduced capacitive coupling between electrically-balanced inductors of a wireless power system, such as those depicted in FIG. 4A.

Generally and broadly, FIGS. 4A-4B depict a vertically-aligned set of magnetically coupled inductors of a wireless power system. The illustrated inductors are constructed with crossovers and, as such, experience reduced capacitive coupling. In this example, a transmitting inductor 400 is defined by a number turns that cross over each other to connect to radially-adjacent sections of another turn. As the electric current moves through the transmitting inductor 400, it encounters impedance that progressively reduces the applied voltage. As such, different portions of the transmitting inductor 400 experience different voltage. However, as a result of the crossovers, the voltage differential between adjacent turns is increased, as compared against the voltage differential between adjacent turns of the inductor depicted in FIGS. 3A-3B which generally follows a gradient from an outer turn to an inner turn. As a result of the increased voltage differential between adjacent turns, the net electric field generated by the transmitting inductor 400—independent of the polarity of voltage applied to the leads of the inductor—spatially averages from the outer turn to the inner turn. As such, the transmitting inductor 400 is an electrically-balanced inductor.

In particular, the transmitting inductor 400 includes a first terminal 402 and a second terminal 404. The transmitting inductor 400 includes four turns (e.g., an inductor having turns of N=4) which are identified in the figure, through line B-B, as the outer turn 400a, the first interior turn 400b, the second interior turn 400c, and the inner turn 400d. It may be appreciated that this is merely one example coil construction; coils or inductors can be constructed using the techniques described herein with any number of suitable turns and/or layers. Similarly, although the transmitting inductor 400 is depicted as a rounded rectangle, such a shape is not required and other shapes are possible.

The transmitting inductor 400 also includes three crossover pairs, identified as a first crossover pair 406, a second crossover pair 408, and a third crossover pair 410. Each crossover pair of the transmitting inductor 400 includes two independent crossovers, an upper crossover and a lower crossover. The upper crossover and the lower crossover of a crossover pair are electrically insulated from one another using any suitable technique.

In this embodiment, if a positive voltage is applied from the first terminal 402 to the second terminal 404, a voltage along any turn of any radial section of the transmitting inductor 400 (referenced from ground or from the second terminal 404) is immediately adjacent to another turn having a substantially different voltage. In other words, voltage to ground for turns of any radial section of the transmitting inductor 400 alternate between relatively high voltage and relatively low voltage.

Similarly, if a negative voltage is applied from the first terminal 402 to the second terminal 404, a voltage along any turn if any radial section of the transmitting inductor 400 (referenced from ground or from the first terminal 402) is, again, immediately adjacent to another turn having a substantially different voltage referenced from ground. In other words, voltage to ground for turns of any radial section of the transmitting inductor 400 alternate between relatively low voltage and relatively high voltage.

As such, the voltage distribution from outer turn to inner turn for the coil construction depicted in FIG. 4A is substantially the same, regardless of the polarity of voltage applied to the leads of the coil. As may be appreciated, the attendant electric fields that result from the alternating voltages locally interfere with one another. More specifically, relative high voltages turns adjacent to relative low voltage turns result in a substantially averaged net electric field. When the current through the transmitting inductor 400 reverses, the turn that was previously relatively high voltage exhibits a relatively low voltage and, similarly, the turn that was previously relatively low voltage exhibits a relatively high voltage. As such, the electric fields attendant to the voltage differences between the turns once again substantially average to a similar net electric field.

When the transmitting inductor 400 is used to transfer power wirelessly, the electric field generated by the voltage differentials between different turns of the transmitting inductor 400 is generally independent of current direction through the inductor. In this manner, when a receiving inductor 412 is aligned with the transmitting inductor 400, capacitive coupling between the inductors is reduced. In FIG. 4B, capacitive coupling between the receiving inductor 412 and the transmitting inductor 400 is modeled with the coupling capacitors $C_1$, $C_2$, $C_4$, and $C_4$.

In one specific example depicted in FIG. 4B, an outer turn 400a of the transmitting inductor 400 is depicted as capacitive coupled—via the coupling capacitor $C_1$—to an outer turn 412a of the receiving inductor 412. Similar coupling relationships are depicted in FIG. 4B for: the first interior turn 400b of the transmitting inductor 400 and the first interior turn 412b of the receiving inductor 412 via the coupling capacitor $C_2$, the second interior turn 400c of the transmitting inductor 400 and the second interior turn 412c of the receiving inductor 412 via the coupling capacitor $C_4$, and the inner turn 400d of the transmitting inductor 400 and the inner turn 412d of the receiving inductor 412 via the coupling capacitor $C_4$.

In this configuration, when the transmitting inductor 400 is magnetically coupled to the receiving inductor 412 (to transfer power wirelessly), the substantially static electric field corresponds to substantially the same voltage across the coupling capacitors $C_1$, $C_2$, $C_4$, and $C_4$. As a result of the substantially constant voltage across the coupling capacitors $C_1$, $C_2$, $C_4$, and $C_4$, no substantial alternating current is transferred as common mode or differential mode noise.

Accordingly, voltage-sensitive systems within a receiver device incorporating the receiving inductor 412 can be operated simultaneously with the wireless power system.

The foregoing embodiments depicted in FIGS. 4A-4B and the various alternatives thereof and variations thereto are presented, generally, for purposes of explanation, and to facilitate an understanding of various possible constructions of electrically-balanced inductors that can be incorporated in, or be otherwise associated with, a wireless power system, such as described herein. However, it will be apparent to one skilled in the art that some of the specific details presented herein may not be required in order to practice a particular described embodiment, or an equivalent thereof.

For example, although the embodiment depicted in FIGS. 4A-4B reference an electrically-balanced inductor operating as a transmitter of a wireless power system, an electrically-balanced inductor can also operate as a receiver of the same wireless power system. For example, in one embodiment, a receiver device (e.g., mobile device) incorporates an electrically-balanced inductor and a transmitter device (e.g., charging mat) incorporates an electrically-balanced inductor.

In some cases, an electrically-balanced inductor incorporated in a receiver device is constructed with a different number of turns than an electrically-balanced inductor incorporated into a transmitter device of the same wireless power system.

In some cases, an electrically-balanced inductor can be implemented with more than one layer of turns. For example, a first turn layer can be positioned over a second turn layer. The turn layers can be electrically connected to one another with one or more crossovers, although this may not be required.

In some cases, an electrically-balanced inductor can include more than one crossover per turn. For example, an electrically-balanced inductor can include two or more crossovers per turn. In further cases, a crossover can have a selected slope or shape different from that depicted in FIG. 4A.

In other cases, an electrically-balanced inductor incorporated in a receive device includes crossovers that are positioned differently than an electrically-balanced inductor incorporated into a transmitter device of the same wireless power system.

In some cases, an electrically-balanced inductor can include different crossover pairs positioned at different radial locations across the inductor.

In some cases, an electrically-balanced inductor incorporated in a receiver device is constructed with a different shape than an electrically-balanced inductor incorporated into a transmitter device of the same wireless power system.

In yet further embodiments, an electrically-balanced inductor can be a member of a set of electrically-balanced inductors that are arranged or distributed in an array. The array can be associated with a transmitter device or a receiver device. The electrically-balanced inductors of the array or distribution of electrically-balanced inductors can be operated independently or simultaneously. In further embodiments, an electrically-balanced inductor can be disposed onto or otherwise accommodated on a substrate, such as a circuit board. The substrate can be positioned relative to another substrate that also accommodates an electrically-balanced inductor.

Figure 5:
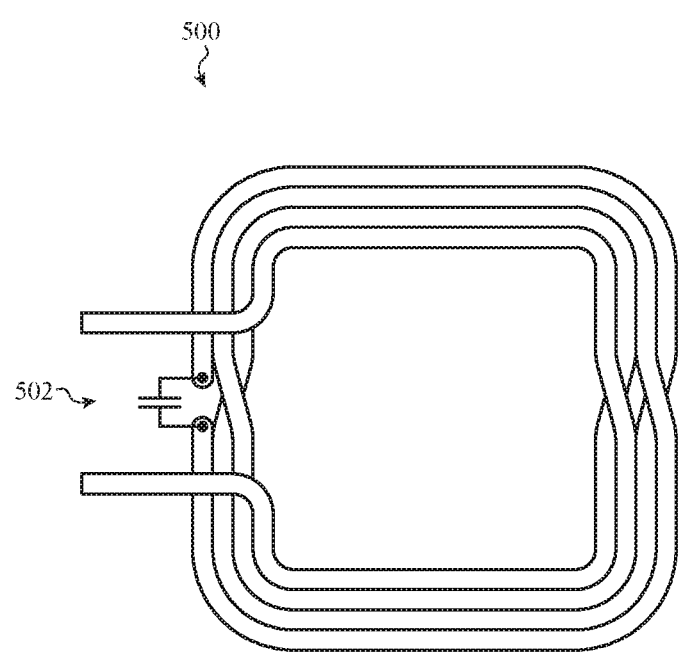
FIG. 5 depicts a self-filtering electrically-balanced inductor of a wireless power system, such as described herein.

In some embodiments, an electrically-balanced inductor can include one or more self-filtering capacitors to mitigate the effects of a direct current bias. For example, FIG. 5 depicts a self-filtering electrically-balanced inductor. The electrically-balanced inductor 500 includes an in-line capacitor 502 that extends across a severed turn of the electrically-balanced inductor 500. The in-line capacitor 502 provides low-frequency (e.g., direct current bias) filtering.

The in-line capacitor 502 in the illustrated embodiment bifurcates the electrically-balanced inductor 500, but this may not be required of all embodiments. Further, other embodiments, can include more than one in-line capacitor. In some embodiments, the in-line capacitor 502 can be a physical element, but this is not required. In one embodiment, the in-line capacitor 502 can be a parasitic capacitance between turns of the electrically-balanced inductor 500.

The foregoing embodiment depicted in FIG. 5 and the various alternatives thereof and variations thereto is presented, generally, for purposes of explanation, and to facilitate an understanding of various possible constructions of electrically-balanced inductors that include an in-line filter capacitor. However, it will be apparent to one skilled in the art that some of the specific details presented herein may not be required in order to practice a particular described embodiment, or an equivalent thereof.

For example, in some embodiments an electrically-balanced inductor can include more than one filter capacitor. In other cases, an electrically-balanced inductor can position the filter capacitor in a different location from that shown in FIG. 5. In yet further embodiments, the electrically-balanced inductor can position the in-line filter capacitor within a crossover. In this example, the crossover can be formed by the in-line capacitor.

The preceding embodiments described in reference to FIGS. 4A-5 generally describe various inductor or coil constructions of an electrically-balanced inductor that can be used as either a transmitting coil or a receiving coil of a wireless power system. It may be appreciated that these electrically-balanced inductors can be manufactured and/or otherwise formed in any number of suitable ways.

Generally and broadly, FIGS. 6A-6E are provided in reference to various example methods of manufacturing and/or constructing an electrically-balanced inductor such as described herein (see e.g., FIGS. 4A-5). In particular, the depicted embodiments relate to a method of manufacturing an electrically-balanced inductor by progressively providing and/or stacking different layers or substrates that accommodate different portions of the electrically-balanced inductor (e.g., crossovers, turn segments, leads, contact pads, in-line filter capacitors and so on). In some examples, the multiple layers can be layers of a multi-layered circuit board. In other examples, the multiple layers can be laminated together in a roll-to-roll manufacturing process. In yet other examples, the multiple layers can be stacked together and further processed in a subsequent manufacturing operation such as, but not limited to: removing material from one or more layers, adding material to one or more layers, electrically bonding one or more layers together, insulating one or more layers, subjecting one or more layers to curing conditions (e.g., temperature, pressure, light, and so on), electrically connecting one or more portions of the layers to one or more electrical circuits, and so on.

Figure 6A:
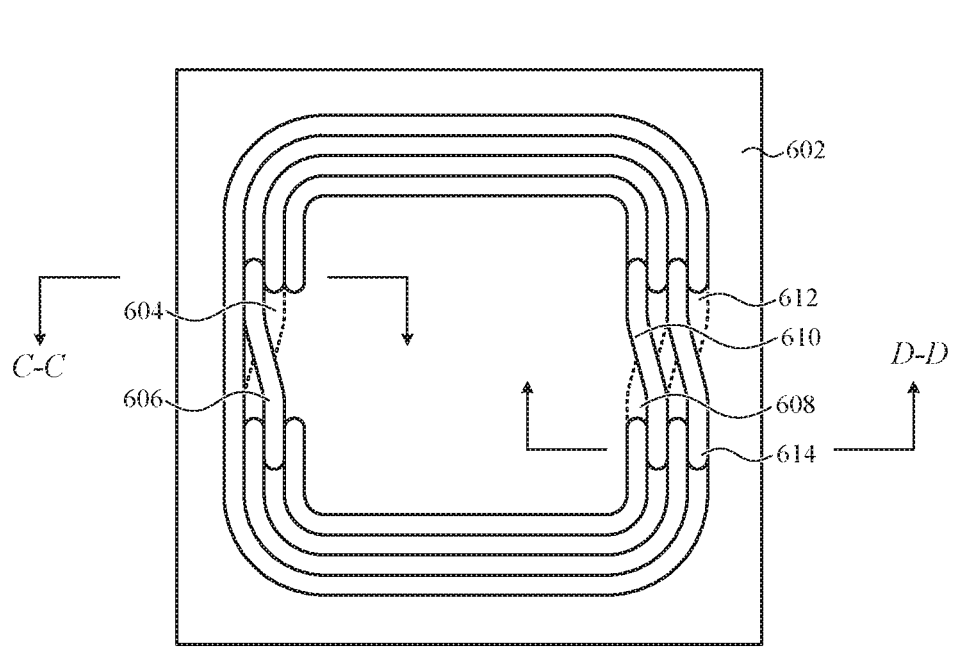
FIG. 6A depicts a top view of one layer of a multi-layer implementation of an electrically-balanced inductor of a wireless power system, such as described herein.

For example, FIG. 6A depicts a top view of one layer of a multi-layer implementation of an electrically-balanced inductor 600 of a wireless power system, such as described herein. IN this example, crossovers can be formed between different turns of the electrically-balanced inductor 600 with a combination of vias and jumpers.

In particular, the electrically-balanced inductor 600 can be formed onto a substrate 602. The substrate 602 can be any suitable dielectric substrate. For example, in some embodiments, the substrate 602 is a circuit board layer, a polymer film, or a glass sheet. The substrate 602 can be flexible or rigid, and may be made from a single layer of material or multiple layers of material.

Different portions of the electrically-balanced inductor 600 can be formed or adhered onto different portions of the substrate 602. For example, as illustrated, the electrically-balanced inductor 600 includes four turn portions along a top portion and four turn portions along a bottom portion. These turn portions are coupled together with crossovers 604, 606, 608, 610, 612, and 614. Some of the crossovers are associated with a top surface of the substrate 602, such as the crossovers 606, 610, and 614 whereas other crossovers are associated with a bottom surface of the substrate 602, such as the crossovers 604, 608, and 612. The crossovers on the bottom surface of the substrate can be coupled to portions of the electrically-balanced inductor 600 formed on the top surface of the substrate with through-substrate vias.

Figure 6B:
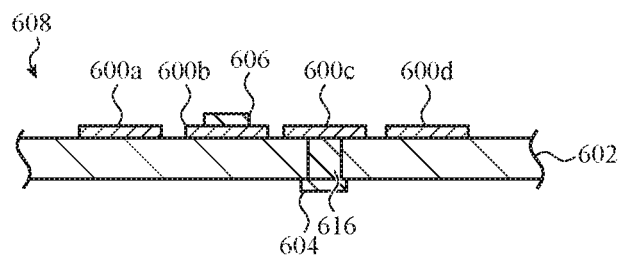
FIG. 6B depicts a cross-section of one layer of the inductor of FIG. 6A.

For example, as shown in FIG. 6B (depicting a cross-section of the electrically-balanced inductor 600 through line C-C), portions of the electrically-balanced inductor 600 on the top of the substrate are identified, respectively, as the turns 600a, 600b, 600c, and 600d. In this example, the crossover 606 is electrically coupled to the turn 600b. The crossover 604, on the underside of the substrate 602, is connected to the turn 600c through the via 616.

Figure 6C:
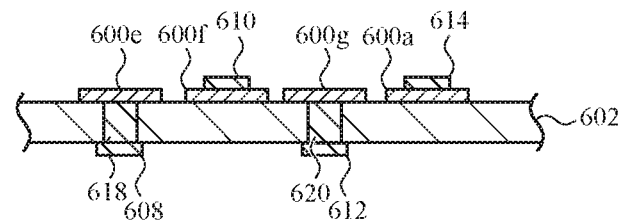
FIG. 6C depicts another cross-section of one layer of the inductor of FIG. 6A.

Similarly, as shown in FIG. 6C (depicting a cross-section of the electrically-balanced inductor 600 through line D-D), portions of the electrically-balanced inductor 600 on the top of the substrate are identified, respectively, as the turns 600e, 600f, 600g, and 600a. In this example, the crossover 610 is electrically coupled to the turn 600f and the crossover 614 is electrically coupled to the turn 600a. The crossover 612 and the crossover 612, on the underside of the substrate 602, are respectively connected to the turn 600e and the turn 600g the vias 618, 620.

Figure 6D:
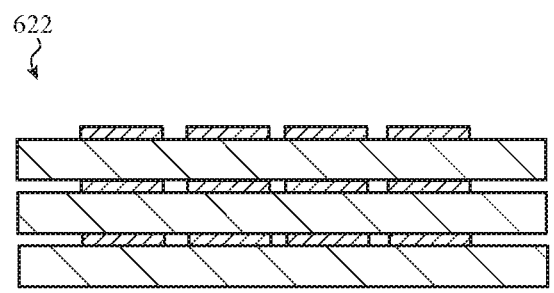
FIG. 6D depicts another cross-section of multiple layers of an inductor, such as shown in FIG. 6A.

In other embodiments, the electrically-balanced inductor 600 can be formed with multiple layers, such as shown in FIG. 6D. In this figure, the electrically-balanced inductor 600 can be formed by electrically connecting independent substrates to one another. In these examples, the electrically-balanced inductor 600 can be formed with multiple layers of turns. In some examples, crossovers can be included between different turns of different layers.

Figure 6E:
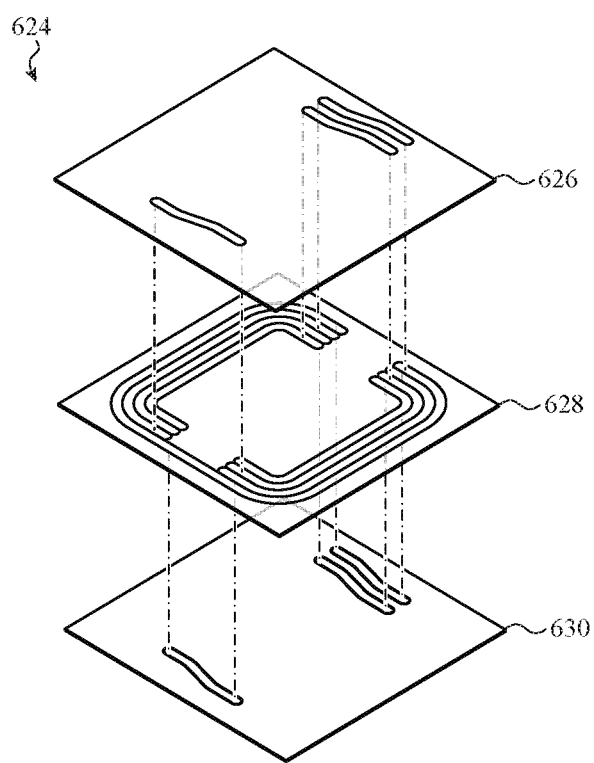
FIG. 6E depicts an example arrangement of electrically-balanced inductors, such as shown in FIG. 6A.

In other embodiments, the electrically-balanced inductor 600 can be formed by laminating different layers or sheets of material together. For example, as shown in FIG. 6E, three layers can be laminated together to for the electrically-balanced inductor 600. In particular, a first crossover layer 626 can be positioned over a turn layer 628 which in turn is positioned over a second crossover layer 630. The first crossover layer 626 and the second crossover layer 630 each include one or more conductive traces that are configured to align with conductive traces (e.g., turns) on the turn layer 628.

The electrically conductive traces of the first crossover layer 626, the second crossover layer 630 and the turn layer 628 can be formed into the substrate 602 or onto a layer of the substrate 60 in any suitable manner. For example, in some cases, electrically conductive traces associated with one or more of the first crossover layer 626, the second crossover layer 630 and the turn layer 628 can be formed into the substrate 602 can be formed by physical vapor deposition, electroplating, electroless plating, etching, or any other suitable method. In some cases, electrically conductive traces associated with one or more of the first crossover layer 626, the second crossover layer 630 and the turn layer 628 can be formed into the substrate 602 can be formed by adhering metal to the substrate or a layer of the substrate.

The various electrically conductive metals selected for the first crossover layer 626, the second crossover layer 630 and the turn layer 628 can be formed into the substrate 602 may be the same or they may be different. Example metals that may be suitable include copper, gold, silver, and so on.

As noted above, the embodiments depicted in FIG. 6A-6E and the various alternatives thereof and variations thereto is presented, generally, for purposes of explanation, and to facilitate an understanding of various example methods of manufacturing and/or constructing an electrically-balanced inductor such as described herein. It will be apparent to one skilled in the art that some of the specific details presented herein may not be required in order to practice a particular described embodiment, or an equivalent thereof.

For example, in some embodiments a substrate can be made from a thin polymer. Electrically conductive traces can be formed onto the polymer using a suitable method. In other examples, the substrate can be made from glass, sapphire, plastic, or another inorganic material. In still further examples, a substrate can be a multi-layer circuit board.

In other embodiments, an electrically-balanced inductor can be formed in another manner. For example, an electrically-balanced inductor can be formed by wrapping wire onto a mandrel in a manner that introduces crossovers. For example, while wrapping the mandrel, separators or shims can be inserted that correspond to turns that have yet to be formed.

In other embodiments, an electrically-balanced inductor can be formed as a part of an array of electrically-balanced inductors on the same substrate. The substrate can be a single-layer substrate, a stack of independent substrates, or a multi-layer substrate.

In other cases, an electrically-balanced inductor can be formed by molding. In these examples, adjacent turns can be connected by mold material channels that are removed in a subsequent operation (e.g., by etching).

In still further examples, an electrically-balanced inductor can be formed by additive manufacturing methods including, but not limited to, electroforming and/or electroplating, three and dimensional plating. In some cases, insulators can be inserted or formed between different turns of the electrically-balanced inductor.

In yet further embodiments, an electrically-balanced inductor can be formed by subtractive manufacturing methods including, but not limited to, laser etching and/or ablation, mechanical scribing and/or cutting, water or particle jet abrasion and/or cutting, and so on.

In still further examples, an electrically-balanced inductor can be formed by severing a conventional inductor (e.g., having spiraling turns) and reconnecting severed portions of the inductor with crossovers.

Figure 7:
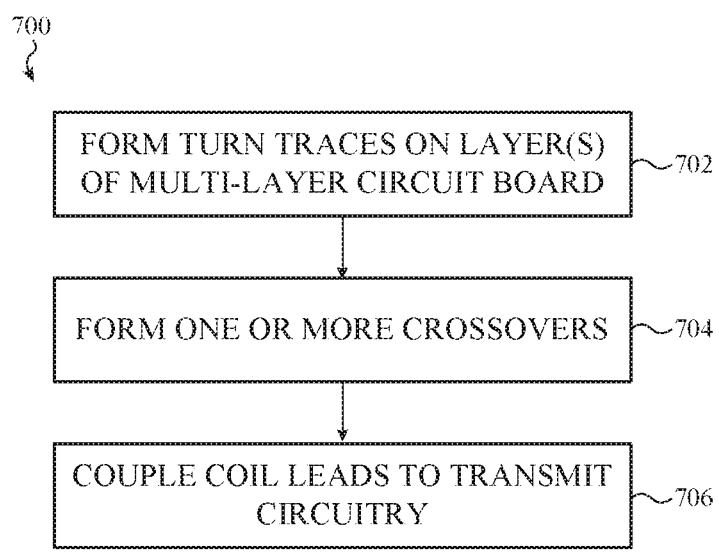
FIG. 7 is a simplified flow chart corresponding to a method of manufacturing an inductor.

FIG. 7 is a simplified flow chart corresponding to a method of manufacturing an inductor. The method 700 can be used to form an electrically-balanced inductor such as described herein. In particular, method 700 can be used to form an electrically-balanced inductor suitable for use in either a receiver device or a transmitter device of a wireless power system, such as described above with reference to FIGS. 1A-2B.

In particular, method 700 includes at operation 702 in which turn traces are formed on one or more layers of a multi-layer circuit board. At operation 704, one or more electrical connections (e.g., crossovers) between the turn traces are formed. The electrical connections can be made by vias, jumpers, separate circuit layers, solder bridges, or any other suitable method. At operation 706, leads of the electrically-balanced inductor is coupled to transmit circuitry.

Figure 8:
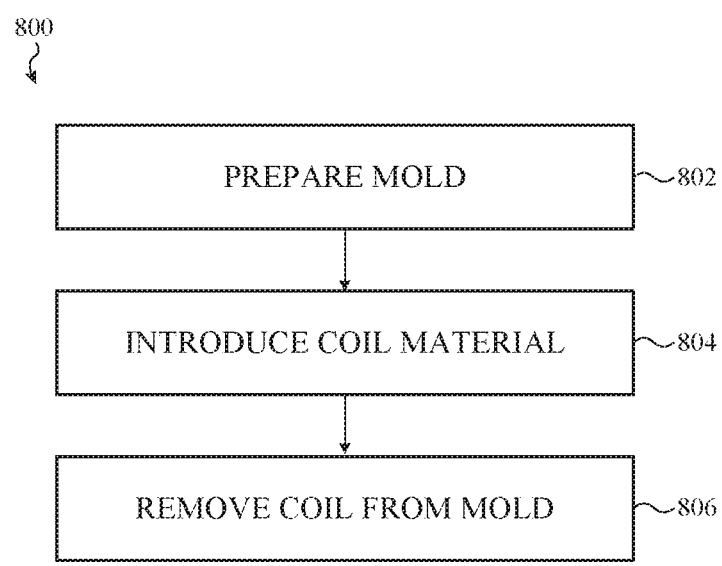
FIG. 8 is a simplified flow chart corresponding to another method of manufacturing an inductor.

FIG. 8 is a simplified flow chart corresponding to another method of manufacturing an inductor. As with other methods described herein, method 800 can be used to form an electrically-balanced inductor such as described herein. In particular, the method 800 can be used to form an electrically-balanced inductor suitable for use in either a receiver device or a transmitter device of a wireless power system, such as described above with reference to FIGS. 1A-2B.

In particular, method 800 includes operation 802 in which a coil mold is prepared to receive mold material. In one example, the coil mold includes a mold cavity that defines a complete electrically-balanced inductor. In other examples, the coil mold includes a mold cavity that defines only a portion of an electrically-balanced inductor, such as a radial section of an electrically-balanced inductor.

At operation 804, coil material can be introduced into the mold. Suitable coil mold materials include, but are not limited to: copper, gold, evaporative pattern casting material, and so on. At operation 806, the molded part is removed from the mold.

Figure 9:
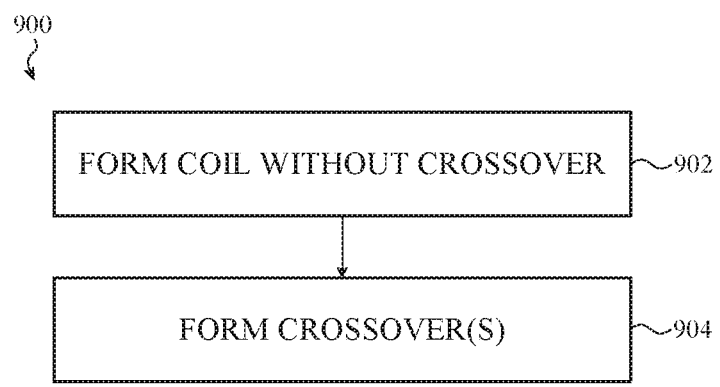
FIG. 9 is a simplified flow chart corresponding to another method of manufacturing an inductor.

FIG. 9 is a simplified flow chart corresponding to another method of manufacturing an inductor. Method 900 includes operation 902 in which a coil is formed without crossovers using a suitable and/or conventional technique. At operation 904, portions of the coil can be cut in order to form crossovers between radially-adjacent sections of turns of the coil.

Figure 10:
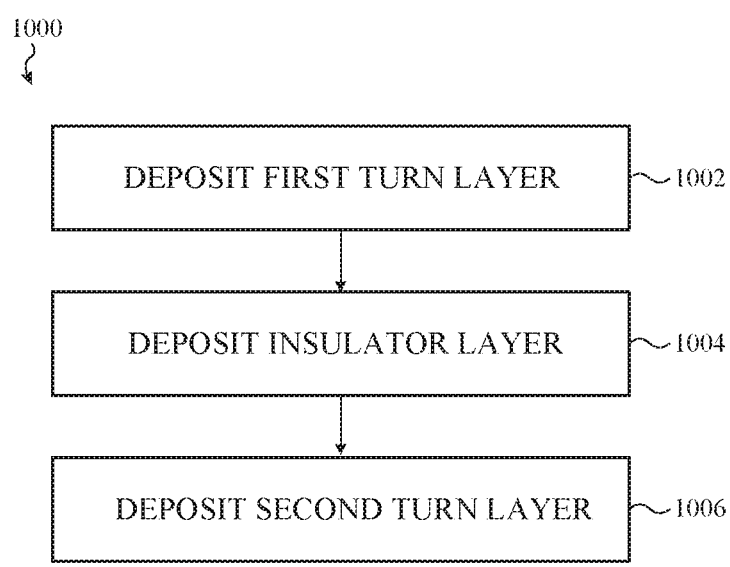
FIG. 10 is a simplified flow chart corresponding to another method of manufacturing an inductor.

FIG. 10 is a simplified flow chart corresponding to another method of manufacturing an inductor, such as described herein. Method 1000 includes operation 1002 in which a first turn layer is deposited onto a substrate. At operation 1004, an insulator layer is deposited over the turn layer. The insulator layer may optionally include one or more apertures or windows through which an electrical connection can be made. At operation 1006, a second turn layer can be deposited over the insulator layer. Optionally, an electrical connection can be made between the first turn layer and the second turn layer.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A wireless power system comprising:
    a transmitter comprising:
        a substrate;
        at least one transmitter coil on the substrate formed with at least one crossover per turn, the at least one transmitter coil comprising;
            a first portion;
            a second portion; and
            an in-line filter capacitor coupled between the first portion and the second portion, wherein at least one crossover is formed by the in-line filter capacitor; and
    a receiver magnetically coupled to the at least one transmitter coil and comprising a receiver coil formed with at least one crossover per turn.

2. The wireless power system of claim 1, wherein:
    the substrate is a layered substrate; and
    the at least one transmitter coil comprises:
        a number of turn layers, each turn layer accommodated by a respective one substrate layer of the layered substrate; and
        at least one via per layer of the layered substrate, the at least one via per layer electrically coupling a first turn layer to a second turn layer.

3. The wireless power system of claim 1, wherein:
    the substrate is first layer of a layered substrate;
    the at least one transmitter coil is a member of a first distribution of transmitter coils; and
    the wireless power system further comprises a second distribution of transmitter coils on a second layer of the layered substrate.

4. The wireless power system of claim 3, wherein the receiver coil is magnetically coupled to the at least one transmitter coil and magnetically coupled to at least a portion of the second distribution of transmitter coils.

5. The wireless power system of claim 1, wherein the in-line filter capacitor is defined by a capacitance exhibited between a first end of the first portion and a second end of second portion.

6. The wireless power system of claim 1, wherein:
    the receiver coil is a first receiver coil; and
    the receiver comprises a second receiver coil formed with at least one crossover per turn.

7. The wireless power system of claim 6, wherein:
    the first receiver coil comprises a first crossover and a second crossover each associated with a first turn; and
    the first crossover is diametrically opposite the second crossover.

8. The wireless power system of claim 1, wherein the crossover is formed in part with a via defined through the substrate.

9. The wireless power system of claim 1, wherein the receiver comprises a capacitive sensor positioned above the receiver coil.

10. A method of forming an inductor array for a wireless power system, the method comprising:
    selecting a turn layer comprising a number of turn trace pairs, each turn trace pair comprising:
        a first turn trace; and
        a second turn trace;
    positioning a crossover layer on the turn layer, the crossover layer comprising a number of crossover traces, each crossover trace positioned over a respective one first turn trace and over a respective one second turn trace; and
    electrically connecting the crossover layer to the turn layer to define at least one inductor the at least one inductor comprising at least one crossover per turn; wherein at least one crossover is formed by an in-line capacitor.

11. The method of claim 10, further comprising laminating the turn layer and the crossover layer together.

12. The method of claim 10, wherein:
the turn layer and the crossover layer are a first combined layer that is a member of a plurality of combined layers.

13. The method of claim 12, further comprising laminating the plurality of combined layers together.

14. The method of claim 10, wherein selecting the turn layer comprises forming the first turn trace and the second turn trace onto a substrate.

15. A method of forming an inductor for a wireless power system, the method comprising:
forming a turn layer comprising:
a first turn trace;
a second turn trace adjacent to the first turn trace;
a third turn trace opposite the first turn trace;
a fourth turn trace adjacent to the third turn trace and opposite the third turn trace;
forming a first crossover by electrically connecting an in-line capacitor between the first turn trace and the fourth turn trace;
depositing an insulating material over the crossover; and
forming a second crossover electrically connecting the second turn trace and the third turn trace.

16. The method of claim 15, wherein:
the turn layer is a first turn layer; and
the method further comprises:
disposing an insulating layer over the first turn layer and the first crossover and the second crossover;
disposing a second turn layer, comprising a fifth turn trace, over the first turn layer; and
forming an electrical connection through the insulating layer between the fifth turn trace and the first turn trace.

17. The method of claim 15, further comprising forming an in-line filter capacitor with at least a portion of the first turn trace and at least a portion of a fifth turn trace.

* * * * *